Oct. 27, 1970   J. E. RICHARDSON   3,536,918
METHOD FOR CALIBRATING THERMAL NEUTRON DECAY LOGGING DEVICE
Filed May 16, 1967

INVENTOR:
J. E. RICHARDSON
BY: *Theodore E. Bieler*
HIS ATTORNEY

United States Patent Office 3,536,918
Patented Oct. 27, 1970

3,536,918
METHOD FOR CALIBRATING THERMAL NEUTRON DECAY LOGGING DEVICE
Jasper E. Richardson, Houston, Tex., assignor to Shell Oil Company, New York, N.Y., a corporation of Delaware
Filed May 16, 1967, Ser. No. 638,940
Int. Cl. G01t; H01j *39/00*
U.S. Cl. 250—83                              5 Claims

ABSTRACT OF THE DISCLOSURE

A method for the downhole calibration of a tool which measures thermal neutron capture rates. The method makes use of induced radio-activity for measuring the equality of measuring intervals and uses an oscilloscope for measuring the exact time between the intervals.

Basically, a thermal neutron decay logging tool consists of a controlled source of neutrons and a detector which are lowered into the borehole. Repetitive, short bursts of fast neutrons irradiate the formations surrounding the borehole. The fast neutrans are slowed down to thermal velocities as they travel through the formation, and the so thermalized neutrons are captured by nuclei of elements in the formation. Gamma rays are produced by thermal neutron capture, and these capture gamma rays are detected at predetermined times by the detector. The number of capture gamma rays is directly related to the number of thermal neutrons, and both decay at the same rate.

One commercially available thermal neutron decay logging service is the "Neutron Lifetime Log" which is offered by Lane-Wells. The logging service with this particular tool is described in an article by Youmans et al. entitled "Neutron Lifetime, a New Nuclear Log," Trans. AIME (March 1964) 319. This logging tool uses a miniature Van de Graaff generator as a source of neutrons, the generator being pulsed at frequent intervals to generate repeated bursts of fast neutrons. The logging tool includes two counting circuits and their associated gates. The gate of the first counting circuit is opened for a 200-microsecond interval approximately 400 microseconds after the start of a neutron pulse. The gate of the second counting circuit is opened for 200 microseconds approximately 100 microseconds after the closing of the first gate.

In addition to thermal neutron capture, there is a second source of gamma rays which are of high enough energy to exceed the threshold of the detector discriminator. Fast neutrons above 9.6 mev. energy, interact with oxygen-16 and produce nitrogen-16 plus a proton. The nitrogen-16 is radioactive and decays to oxygen-16 plus a beta particle. The final oxygen-16 nucleus is left excited and emits a high energy gamma ray. The half life of this nitrogen-16 decay is approximately 7.3 seconds. This presents a background to the measurements of the capture gamma rays. Since the center-to-center time between gates is 300 microseconds while the half life of the nitrogen-16 radioactivity is 7.3 million microseconds, the background level due to nitrogen-16 will be essentially constant during the time interval between gates. It is desirable that this background level be determined in order that it may be subtracted from the total counting rates of each of the two gates. Since it is essentially constant during the time interval between gates, this induced background can be used to determine the relative widths of the gates.

In respect to the above-entioned type of tool, it can be readily appreciated that the accuracy of the results depends upon (1) the widths of the two counting gates being closely the same, (2) the time between gates being accurately known and (3) an accurate determination of the background radiation level. With respect to the timing circuits associated with the gates, they can, of course, be calibrated by adjusting the circuitry at the surface prior to lowering the tool into the borehole. In the prior procedures, these critical timing values have not been rechecked after the tool is lowered into the borehole until after collecting the measurement data and the tool is retrieved.

A small difference in the width of one counting gate relative to that of the other gate will introduce a significant error in the final results, and, for a given difference in gate widths, the resulting error in the final determination will depend upon the properties of the formation. For typical formation properties, a 5 percent difference in gate widths, will produce about a 20 percent error in the final determination. Likewise, a small error in the time between gates or in the determination of background radiation level can result in an appreciable error in the final determination.

The present invention provides a method for operating such a tool so that parameters inclusive of the relative widths of the counting gates, the exact time between the gates and the background radiation level can be determined while the tool is actually in use. Thus, these parameters are determined with the tool disposed in its operating environment and subject to the high temperatures and physical motion that occur while running a log. In practicing the present invention, a repetitive source of high energy neutrons and a system for measuring the gamma lays produced by the capture of thermal neutrons are operated in the borehole to be logged, with the source being operated to induce radioactivity due to nitrogen-16 and the measuring system being operated to meaasure nitrogen-16 radioactivity indicative of at least one parameter of the interrelation between the source, the measuring system and the surrounding earth formation.

In determining the relative widths of the counting gates, the logging tool is lowered to a selected depth, and the neutron source is operated for a period of a few minutes. The tool is then moved until the detector is at the location originally occupied by the source, and the source is turned off. A record of the counts from the two respective counting gates is then made for about one minute. The above steps are repeated until the total accumulated counts for each of the counting gates has the desired degree of statistical accuracy. If, in fact, the two counting gates are of equal width, then the accumulated counts will also be equal. If the counting gate widths are different from one another, then the accumulated counts will vary in direct relation to the difference in the widths of the counting gates.

The time between the gates is preferably measured by displaying the detector pulses from the respective gates on an oscilloscope so that the position of a pulse on the sweep axis is a measure of the time of occurrence of the pulse. The display is photographed with an exposure time sufficiently long to delineate the intervals of sweep covered by pulses from each respective gate. Measuring the center-to-center distance between the intervals covered by pulses from the respective gates measures the time between the gates. Since the oscilloscope can be calibrated with an oscillator of known frequency, the distance between the intervals indicates the time between the gates. The measurement is not restricted to the center-to-center distance but can be made from any point in one interval to the corresponding point in the next interval.

The background radiation can be measured by moving the tool at the desired logging speed with the neutron source on. Upon reaching the selected depth (1) the tool is stopped while simultaneously (2) the source is turned off and (3) the counts from the detector are recorded on a moving film for a period of about one minute. The above steps may be repeated for a total of say 10 runs if increased statistical accuracy is desired. From the total record of counting rate versus time, the curve is extrapolated to the time at which the source was turned off. This is the background radiation level while the source was on. An alternative procedure is to inject an aqueous solution into the formation which contains an element, such as boron, which has a high probability (cross section) for capturing thermal neutrons and a low probability for reacting with fast neutrons. This solution should displace the initial formation fluid for a distance greater than the depth of investigation of the logging device. Since the nitrogen-16 radioactivity background is produced by fast neutrons while the capture gamma ray signal is produced by thermal neutrons, the net effect is the signal from background radiation only. This is then measured at the desired logging speed.

The above methods will be more easily understood from the following detailed description of preferred embodiments when taken in conjunction with the attached drawings in which.

Figure 1:
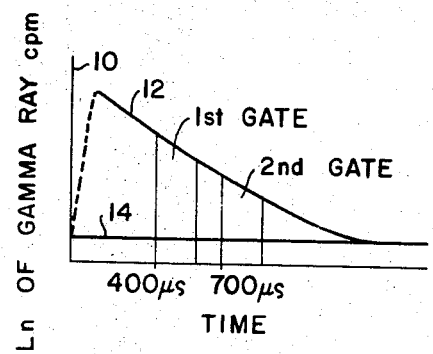
FIG. 1 shows a decay curve for thermal neutrons in the formation and a level of background radiation.

For a more complete understanding of the operation of the available thermal neutron decay logging devices, reference is made to the drawings. FIG. 1 illustrates at 10 the buildup and decay of gamma ray activity. Between short bursts of high energy neutrons from the neutron source, the gamma rays due to thermal neutron capture increase rapidly to a peak value and then more slowly decay along an exponential curve 12. The background radiation level due to fast neutrons is illustrated at 14 and can be assumed to be of constant value over the short time interval shown in FIG. 1. The gamma rays resulting from both the background radiation due to fast neutrons and the activity due to thermal neutrons are counted during a first counting gate period which commences at approximately 400 microseconds after the start of a neutron pulse and continues for 200 microseconds. The second counting gate starts 100 microseconds after the end of the first and also continues for 200 microseconds.

The decay curve 12 illustrates the decay of gamma rays that result from the interaction of the thermal neutrons with the various formation materials and fluids contained therein. The decay curve 14 represents the gamma rays due to the interaction of fast neutrons with oxygen according to the equation

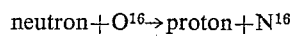

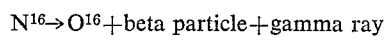

Since it is known that the half life of nitrogen-16 is approximately 7.3 seconds, the gamma-ray activity due to induced nitrogen-16 radioactivity can be considered constant during the several hundred microseconds between gates. Thus, the logging tool will provide information for the following equation:

$$\frac{1}{V\Delta t}\ln\frac{N_1}{N_2}=\Sigma_r(1-\phi)+\Sigma_w S_w\phi+\Sigma_{ho}(1-S_w)\phi \quad (1)$$

wherein $N_1$ equals the counting rate recorder during the first gate interval;

$N_2$ equals the counting rate recorded during the second gate interval, with the background level having been subtracted from both counting rates;

V equals the velocity of thermal neutrons;

$\Delta t$ equals the center-to-center time interval between the two counting gates;

$\Sigma_r$ equals the capture cross section of the formation rocks;

$\Sigma_w$ equals the capture cross section of the formation water;

$\Sigma_{hc}$ equals the capture cross section of the contained hydrocarbons;

$\phi$ equals the fractional porosity; and $S_w$ equals the fractional water saturation.

The formula is normally solved for the fractional water saturation by assigning a value to the capture cross section of the rock and measuring the porosity and the capture cross sections of the water and the contained hydrocarbons, respectively. The porosity is measured either from cores or with one of the porosity logging tools. The capture cross sections of the water and the hydrocarbons are measured from fluid samples obtained from the formation.

Figure 2:
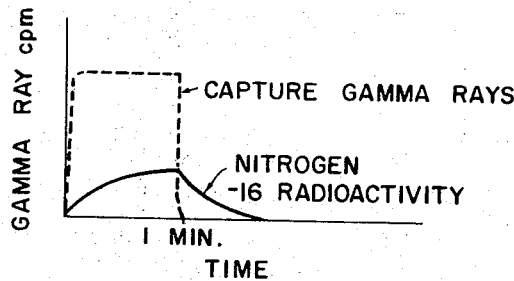
FIG. 2 shows a buildup of capture gamma rays and nitrogen-16 radioactivity, as a result of irradiating a formation with fast neutrons, and their decay when the source is turned off.

The present invention utilizes a novel method for measuring the background radiation level. The magnitude of the induced radioactivity background will depend upon the formation, the neutron source intensity, the source-to-detector spacing, the logging speed and whether the tool is in open or cased hole. It is desirable then that the background be determined for the conditions that actually exist. FIG. 2 shows the signal recorder by one of the gates, say the first gate, with the tool stationary in the borehole. When the source is turned on, the capture gamma-ray signal increases to maximum value in a time determined by the time constant of the measuring instrument. This may be a few tenths of a second. The nitrogen-16 radioactivity increases more slowly depending upon the duration of a neutron pulse and the time between pulses. About 1 minute is usually required to reach maximum value. When the source is turned off, the capture gamma ray contribution to the total signal decays at a rate determined by the time constant of the measuring instrument while the nitrogen-16 radioactivity decays with a 7.3 second half life. Thus, with a small time constant for the instrument one can easily distinguish between the two decays.

The level of nitrogen-16 background denoted by 14 in FIG. 1 will depend upon how long the detector effectively "sees" the formation. In other words, how far on the buildup portion of the nitrogen-16 radioactivity curve has been reached while the moving tool is passing a formation. This, of course, depends upon the logging speed. Although the level of nitrogen-16 radioactivity background will vary with logging speed, for a given logging speed, it will contribute equally to both gates since its decay during the time between gates will be almost insignificant. As can be be seen from FIG. 1, the ratio $N_1$ to $N_2$ in Equation 1 will not be accurate unless the background is determined and substracted. The method of this invention makes use of the ability to separate the capture gamma ray and the nitrogen-16 radioactivity decays as shown in FIG. 2.

The preferred method consists of logging upwardly through the borehole at the desired logging speed and towards a selected depth. Upon reaching the selected depth, the tool is stopped while, simultaneously, the neutron source is turned off. The induced radioactivity is then recorded on a moving film during the following one-half to one minute interval. The above steps are repeated a number of times in order to accumulate a sufficient number of counts for the desired statistical accuracy. Normally, about 10 repeats are required to determine the background to within about ±10 percent accuracy. The data are then combined to give a curve plotting background counting rate versus time. The extrapolation of this curve to the time the tool was stopped and the source turned off is the background counting rate, while the source was still on. The method of this invention can be applied at any logging speed, in cased or uncased holes and whether the cased holes are perforated or unperforated.

Figure 3:
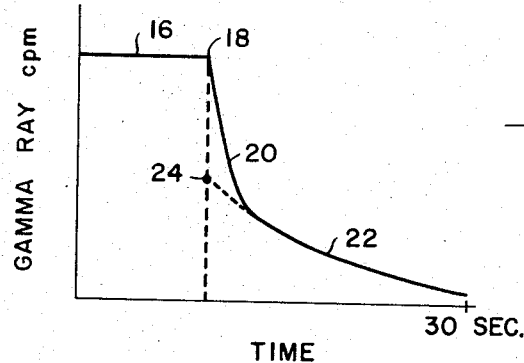
FIG. 3 shows the total counting rate while the neutron source is on and the decay of the capture gamma ray portion and the induced radioactivity portion respectively after the source is turned off.

This method can be more easily understod by referring to FIG. 3. In FIG. 3, 16 is the level of the total counting rate while the neutron source is on. This total counting rate is made up in part by gamma rays produced by neutron capture and in part by gamma rays from induced radioactivities. The source is turned off at 18. The portion 20 of the signal decay decreases rapidly in a time determined by the time constant of the instrument. The portion 22 of the signal decay is due to induced radioactivities and decreases comparatively slowly according to the half life of the radioactivity. By recording the curves 20 and 22, or a significant portion of 22 only, the curve 22 can be extrapolated to point 24 which is the level of the induced radioactivity background while the source was still on.

Figure 4:
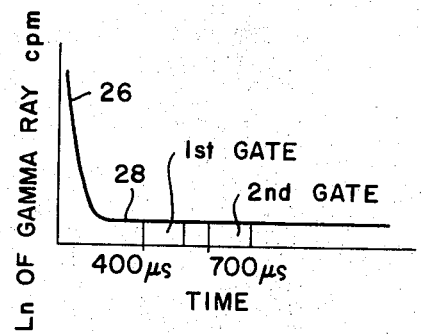
FIG. 4 shows the decay curve for capture gamma rays and the nitrogen-16 radioactivity when the formation fluids have been displaced with an aqueous solution having a high thermal neutron capture cross section.

An alternative procedure can be used in open hole or in cased hole with perforations. The alternative method consists of injecting into the formation an aqueous solution which contains an element, such as boron, which has a large cross section for thermal neutron capture and a small cross section for reacting with fast neutrons. A sufficient volume of this solution is injected to displace the initial fluid to a radial distance greater than the depth of investigation of the measuring device. The effect is illustrated in FIG. 4 wherein 26 is the rapid decay of the capture gamma ray signal due to the presence of the large capture cross section element and 28 is the nitrogen-16 background which has been unaffected by the injected liquid. Thus, the background can be measured at any desired logging speed and subtracted from the total signal shown in FIG. 1.

Before subtracting the background which has been determined by either the preferred method or by the alternative method, it is necessary that all data be normalized to the same neutron source intensity. The logging tool, as offered commercially, is provided with a neutron monitor adjacent to the neutron source. However, the monitor does not respond linearly to an increase in neutron intensity. This is due to the duration of a neutron pulse being much shorter than the dead time of the monitor. As a result, the monitor cannot record more than one count per neutron pulse. The monitor response can be described theoretically using the mathematics of a Poisson distribution. Thus, one can derive the equation $$M = A(1 - P_o) = A(1 - e^{-pn}) \quad (2)$$

where $M$ is the monitor response in counts per minute;
$A$ is the number of neutron source pulses per minute;
$P_o$ is the probability that no neutron will produce a monitor count per neutron source pulse;
$p$ is the probability that an individual neutron will produce a monitor count; and
$n$ is the number of neutrons per neutron source pulse.

The effect of the environment will be reflected in the value of $p$. For a fixed environment, the counting rate from, say, the first gate, $G_1$, will increase linearly with $n$; i.e., $$n = aG_1$$

where $a$ is a constant of proportionality.
Thus, our equation becomes $$M = A(1 - e^{-paG_1}) \quad (3)$$

This equation has been checked experimentally by recording $M$ and the corresponding $G_1$ with the tool stationary in open hole and for several neutron source intensities. For the conditions measured, $A$ had the value $5.4 \times 10^4$ while $pa$ had the value $3.3 \times 10^{-5}$. Thus $$M = 5.4 \times 10^4 (1 - e^{-3.3G_1 \times 10^{-5}}) \text{ c.p.m.}$$

With this equation for the monitor response curve, the measured background can be subtracted from the measurement of capture gamma ray signal plus background after normalizing to the same neutron source intensity. Equation 3 has also been used to relate the monitor response curves for different borehole environments. All that is required is to measure the relative values of the product $pa$ for the same neutron source intensity.

As mentioned above, accurate determinations of the final result also require that the two gates be of equal duration, or width. The exact widths of the two gates is not too important, but it essential that the two gates have the same width. This is so because Equation 1 is a theoretical equation representing the counting rates, $N_1$ and $N_2$, respectively, at two points on the decay curve separated by time $\Delta t$ whereas the actual measurements are not of two points but of two areas under the curve. It can be shown that if the decay is purely exponential, the ratio of the two areas is the same as the ratio of counting rates at two points separated by the center-to-center time between areas providing the gate widths are exactly the same.

In prior procedures, the gate widths have been adjusted on the surface using the appropriate measuring instruments. However, once the tool has been lowered into the borehole, there has been no way to recheck the gate widths until the tool has been returned to the surface. While attempts are made to stabilize the various electronic circuits in the logging tool to insure that the widths of the gates as set at the surface remain constant, such attempts are not always successful. As a result of the constant temperature increase with depth in all boreholes, the logging tool is subject to a temperature change from surface temperature to 200–300° F. at the bottom of the borehole. In addition, there are possible effects from vibration while moving the tool in the borehole. Thus, while tests can be made at the surface to calibrate the gates, there is no assurance that the gates as calibrated will remain fixed in a borehole environment. Accordingly, some method is required to assure that the gate widths have indeed remained equal when the logging tool is disposed adjacent the interval of interest.

The present invention provides a novel means for determining the relative widths of the two gates while the logging tool is actually in operation adjacent the interval of interest in the borehole. The method consists of stopping the tool at the desired depth, and operating the neutron source for a period of a few minutes so that the induced nitrogen-16 radioactivity will build up a significant value. The neutron source is then turned off. As described in connection with FIG. 2, the capture gamma ray portion of the total signal will decay in a short time determined by the time constant of the instrument. It is preferred, of course, that this time constant be as small as possible. The nitrogen-16 radioactivity will decay with a 7.3 second half life, and due to the relatively short time interval between the counting gates, will contribute essentially the same counting rate to both gates. A record of the nitrogen-16 counts from the two respective counting gates is made for about one minute. The recording is done on the surface using, for example, a galvanometer-moving film arrangement or a scaling circuit connected to the output from each gate. The above steps are repeated until the total accumulated counts for each of the counting gates has the desired degree of statistical accuracy. If the two counting gates are of equal width, then the accumulated counts will also be equal.

If the counting gate widths are different from one another, then the accumulated counts will differ in direct relation to the difference in the respective widths of the counting gates.

For a logging tool of this type, the gamma ray detector is generally located a foot or two away from the neutron source. Since the induced nitrogen-16 radioactivity is produced by a fast neutron reaction, the level of nitrogen-16 radioactivity in the vicinity of the source will be about tenfold higher than in the vicinity of the detector. Therefore, the time required to accumulate the desired number of counts can be reduced appreciably by operating in the following meaner. First, with the tool stationary, energize the neutron source for a few minutes as described above. Then move the tool until the detector is at the location originally occupied by the source and turn the source off. A record of the counts from the respective counting gates due to induced nitrogen-16 radioactivity is made in the same manner as described above. The information obtained is the same as that from the procedure in which the tool remains stationary, but it can be obtained in a much shorter time.

In addition to determining the background radiation level and the equality of the gate widths, the accuracy of the final results depends upon knowing the exact time interval between counting gates. By time interval is meant the start-to-start, middle-to-middle or end-to-end time between gates. In other words, the time between some point in one gate to the corresponding point in the other gate. In other words, the time interval is measured between the same point in one gate to the corresponding point in the other gate. In prior procedures, the time between gates has been adjusted on the surface in the same manner as has been described for the gate widths. The tool is then lowered into the borehole and subjected to the high temperatures and vibrations associated with the logging procedure. Once the tool has lowered into the borehole, there has been no way to recheck the time between gates until the tool is brought back to the surface. Although efforts have been made to stabilize the electronic circuits, there is no real assurance the time between gates in a horehole environment remains the same as it was at the surface. Accordingly, some method is needed to measure this time while the tool is operating in the borehole.

The present invention provides a novel means for determining the exact time between gates while the logging tool is in operation adjacent the interval of interest in the borehole. The commercial logging tool (Neutron Lifetime Log) described above includes an oscilloscope in the logging truck. From the downhole sonde, a pulse is sent to the surface which represents the starting time for a cycle of the measurement sequence. This pulse triggers the oscilloscope sweep and thus establishes a time zero reference. Following this pulse, are the pulses representing counts from the respective gates. The counts from the gates are displayed during the oscilloscope sweep as an indication of when the gates are open. The method can be better understood by referring to FIG. 5 wherein 32 is the oscilloscope sweep which is triggered at 30 and moves from left to right. Pulses such as 38 and 40, representing counts from the respective gates, do not appear during the time interval from 0 $\mu$s. to 400 $\mu$s. since during this time interval neither gate is open. For the same reason, pulses are not displayed in the time interval from 600 $\mu$s. to 700 $\mu$s. or at times greater than 900 $\mu$s. All pulses representing counts from the first gate will fall within the envelope 34. All pulses representing counts from the second gate will fall within the envelope 36. Thus the width of an envelope in a measure of the time the associated gate remains open. The distance between envelopes is a measure of the time interval between the two gates. It is assumed here that the oscilloscope has been properly calibrated. Actually, the distance along an oscilloscope sweep is measured in units of length such as centimeters. Its circuitry is designed so that a unit of length corresponds to a known unit of time. However, as with the logging tool, the oscilloscope circuits are not as reliable in the field as in the constant temperature and constant voltage conditions existing in the laboratory. Since the purpose of the invention is an accurate measurement of time, it is important that the oscilloscope sweep be calibrated. This can be done in the field with, say, a 40 kc. oscillator. The oscillator can be used to display pulses across the oscilloscope sweep which occur at accurately known times. From this one can construct a calibration curve plotting centimeters sweep versus time.

Figure 6:
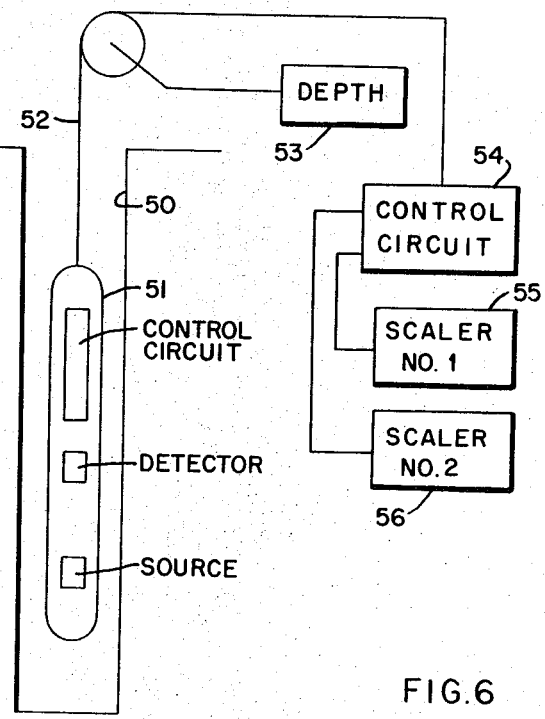
FIG. 6 is a block diagram of the thermal neutron decay logging tool and recording system used in this invention.

FIG. 6 illustrates a thermal neutron decay logging tool and recording system that can be used in the above-described processes. More particularly, there is shown a logging tool 51 suspended in a borehole 50 by means of a cable 52. The cable 52 should contain both the mechanical strength for supporting the logging tool in the borehole as well as the circuits for supplying power and control signals to the tool and conveying signals from the tool to the surface. The tool utilizes a source located at the bottom and a detector located at the middle of the tool with the control circuits being located at the top of the tool. The control circuits are designed to control the activation of the source as well as transmission of the detector signals to the surface. The cable at the surface passes over a measuring sheave that measures the length of the cable and thus the position of the tool in the borehole. The signal from the measuring sheave can be recorded on a depth recorder 53. The signals from the downhole tool are supplied to a control circuit 54 which in turn controls the operation of the two scalers 55 and 56. As explained above, the signals from the detector can be gated over equal time intervals to the two scalers or can be recorded on an oscilloscope, photographic film, or other recording means. Further, as explained, the thermal neutron decay logging tool is a commercially available tool having the various circuits described above. Thus, no further description is deemed necessary for those skilled in the art.

Figure 5:
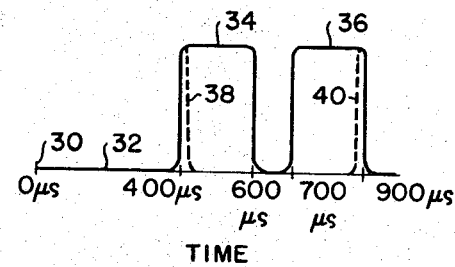
FIG. 5 shows the envelopes of pulses which occur during the respective gate periods and individual pulses which contribute to the envelopes.

Returning to the envelopes 34 and 36 in FIG. 5, it was stated that the width of an envelope is a measure of the time duration of a gate and that the distance between envelopes is a measure of the time between gates. Actually the former will not be too accurate a measurement. In traveling through, say, 10,000 feet of cable connecting the downhole tool to the surface equipment, pulses from the tool are broadened, and the gate width observed on the oscilloscope display will be somewhat wider than the true gate width. However, in regard to time between gates, this pulse broadening will affect both envelopes equally. Thus, one can determine the exact time between gates by measuring from some point in one envelope, say its center, to the corresponding point, the center in this example, in the other envelope. The manner of using the envelopes will depend upon the magnitude of the counting rates. If the counting rates from the respective gates are both high, then the necessary information can be obtained by direct observation of the oscilloscope display. If the counting rate from one, or both, gates is low, then the envelopes can be obtained by a time exposure with an oscilloscope camera. With the photographic method, difficulty might be experienced if the counting rate from one gate is appreciably greater than the counting rate from the other gate. This could occur if the pulses are from capture gamma rays and the signal, such as that shown in FIG. 1, has a rapid decay. Under these circumstances, one could overexpose the photograph of one envelope or underexpose the photograph of the other. The preferred source of pulses would be those from the induced nitrogen-16 radioactivity. As explained above in the method of measuring for equality of gate widths, this radioactivity contributes essentially the same counting rates to both gates. Thus, by use of the induced nitrogen-16 radioactivity both the measurement of the equality of gate widths and the measurement of the time between can be performed simultaneously. The former can be recorded on moving film or with scalers while the latter is being recorded on the oscilloscope.

I claim as my invention:

1. A process for calibrating a tool containing a repetitive source of high-energy neutrons and a measuring system utilizing a pair of counting intervals for measuring rates at which thermal neutrons are captured in and around the borehole of a well, which process comprises:

operating the neutron source in a portion of the borehole that is to be logged and inducing radioactivity due to the decay of nitrogen-16; and operating the measuring system in the vicinity of said induced radioactivity so that the measurements of nitrogen-16 radioactivity are obtained which are indicative of at least one parameter of the interrelation between the source, the measuring system and the surrounding earth formation.

2. The process of claim 1 in which:

the source is operated at a selected depth long enough for the nitrogen-16 radioactivity to reach a significant value;

the sensitive portion of the measuring system is moved to said selected depth; and measurements are made of the nitrogen-16 radioactivity present during each of the counting intervals for measuring thermal neutron decay rates, so that the equality of the counting intervals is indicated by the equality of the counts.

3. The process of claim 1 in which:

the source and measuring system are operated repetitively at a selected depth within the borehole; and the beam of a cathode ray tube is repetitively advanced along one axis at fixed rates initiated in fixed time relation with the production of neutrons while being deflected along the other axis in proportion to the receipts of gamma rays by the measuring system, so that said deflections define the time histories of the counting intervals and the distances between the interval-defining deflections is proportional to the time between the counting intervals.

4. The process of claim 1 in which:

the source is moved to a selected depth within the borehole while neutrons are being emitted;

the movement of the source and the emission of neutrons are stopped, substantially simultaneously; and measurements are made of the gamma rays received during a period exceeding that during which they are produced by the capture of thermal neutrons, so that the measurements are indicative of the amount of background radioactivity.

5. A method for calibrating the length of the measuring gates of a thermal neutron decay logging tool having two equal-length measuring intervals separated by a time interval, said method comprising:

holding the logging tool stationary adjacent an interval of interest in a borehole;

irradiating the interval of interest for a period of between 0.5 to 3.0 minutes;

at the end of the irradiating period measuring and recording the counts from the two time gates over a period of from 0.5 to 1.5 minutes; and utilizing the difference between the totals for the two time gates to correct measurements made with the logging tool.

References Cited

UNITED STATES PATENTS 2,948,810 8/1960 Caldwell et al.
3,184,598 5/1965 Tittle.
3,213,279 10/1965 Caldwell.

ARCHIE R. BORCHELT, Primary Examiner

U.S. Cl. X.R.

250—83.6